US007002172B2

(12) United States Patent
Rensch

(10) Patent No.: US 7,002,172 B2
(45) Date of Patent: Feb. 21, 2006

(54) ELECTRONIC SAFETY SYSTEM FOR THE AVOIDANCE OF AN OVERSPEED CONDITION IN THE EVENT OF A SHAFT FAILURE

(75) Inventor: Detlef Rensch, Ludwigsfelde (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 117 days.

(21) Appl. No.: 10/798,367

(22) Filed: Mar. 12, 2004

(65) Prior Publication Data

US 2005/0047913 A1 Mar. 3, 2005

(30) Foreign Application Priority Data

Mar. 13, 2003 (DE) ................................ 103 10 900

(51) Int. Cl.
*G01N 21/88* (2006.01)

(52) U.S. Cl. ...................................... 250/559.45; 415/9

(58) Field of Classification Search ................ 324/160, 324/161; 250/200; 415/9, 14
See application file for complete search history.

(56) References Cited

U.S. PATENT DOCUMENTS

| | | | | |
|---|---|---|---|---|
| 4,712,372 | A | 12/1987 | Dickey et al. | 60/39.281 |
| 5,411,364 | A * | 5/1995 | Aberg et al. | 415/9 |
| 6,494,046 | B1 | 12/2002 | Hayess | 60/779 |
| 2003/0091430 | A1 | 5/2003 | Mulera et al. | 415/14 |

FOREIGN PATENT DOCUMENTS

| | | |
|---|---|---|
| DE | 19857552 | 6/2000 |

* cited by examiner

*Primary Examiner*—David Porta
*Assistant Examiner*—Tony Ko
(74) *Attorney, Agent, or Firm*—Harbin King & Klima

(57) ABSTRACT

An electronic safety system for the detection of a shaft failure and for the interruption of the energy supply to the shaft includes at least one measuring light guide (13) which is firmly routed in the shaft longitudinal direction, co-rotates with the shaft (1) and is connected to a light source (18) on a light inlet side (14). In the event of a shaft failure, the measuring light guide will break to diminish light transmission therethrough, with the absence of light on a light outlet side (15) being detected by an optical sensor (19) and being used, via evaluation and control electronics (20, 21), as a signal for the shut-off of the further energy supply at a fuel shut-off valve (22). The measuring light guide is fixed to a measuring sleeve (4) attached at both ends to the shaft.

22 Claims, 2 Drawing Sheets

ELECTRONIC SAFETY SYSTEM FOR THE AVOIDANCE OF AN OVERSPEED CONDITION IN THE EVENT OF A SHAFT FAILURE

This application claims priority to German Patent Application DE10310900.5 filed Mar. 13, 2003, the entirety of which is incorporated by reference herein.

BACKGROUND OF THE INVENTION

This invention relates to an electronic safety system for the avoidance of an overspeed condition in the event of a shaft failure by detection of the shaft failure and subsequent interruption of the further energy supply, in particular on a gas turbine engine.

In the event of a failure of a shaft, which has a driving side and a driven side, i.e. an energy-generating and an energy-consuming side, the driving side which is now detached from the energy-extracting driven side will, as a general problem, be accelerated considerably, this resulting in a serious hazard to persons and material. Such an overspeed condition is particularly problematic where the respective shaft is part of a means of passenger transport, for example an aircraft powered by gas-turbine engines. In an aircraft engine, the failure of the low-pressure turbine shaft, in particular, and the resultant uncontrolled speed increase of the driving side of the low-pressure turbine shaft connected to the low-pressure turbine rotor can lead to the destruction of the engine and damage of the aircraft, thus constituting a considerable danger to persons and property.

In particular on gas turbines, especially gas turbine engines, various devices for the mechanical or electronic detection of a shaft failure and for the subsequent interruption of the further fuel supply to avoid or control a dangerous overspeed condition are known.

In a safety system described in Patent Specification U.S. Pat. No. 4,712,372, inductive sensors are arranged on both the toothed driving side (turbine rotor) and the toothed driven side (fan) of the turbine shaft which produce a speed-proportional signal corresponding to the number of pulses counted. If a speed difference resulting from a higher speed of the driving-side end of the shaft and, thus, a shaft failure is registered, a fuel solenoid valve is actuated and the fuel supply interrupted in order to stop powering the turbine rotor.

Generally, the known electronic safety systems of gas turbine engines are disadvantageous in that the time period until shut-off of the fuel supply is relatively long, this resulting in increased strength requirements on the low-pressure turbine blades in connection with a higher weight and higher costs. High investment is also incurred by the required cooling or heat shielding of the sensors and the electric connections situated in the hot zone of the low-pressure turbine shaft.

Furthermore, mechanical shut-off systems are described in which a reference shaft is coaxially associated to the turbine shaft and connected to the driven end of the turbine shaft. In the event of a shaft failure, the resultant rotation of the turbine shaft relative to the reference shaft is used to mechanically actuate the fuel valve. In a known device of this type, offset recesses are provided on the driving end of the turbine shaft and on the corresponding end of the reference shaft, which, in the case of a shaft failure, will come into coincidence, thereby releasing a pre-loaded driver. The driver, which swings out radially, engages a loop of a wire rope which is connected to the fuel shut-off valve and which closes the fuel-shut off valve by the pull exerted on it by the driver of the low pressure shaft.

Since the required angle of rotation between the turbine shaft and the reference shaft until release of the pre-loaded driver is relatively large, the time until shut-off of the fuel supply will be correspondingly long. Also, the mechanical systems make great demands in terms of design, assembly and space.

BRIEF SUMMARY OF THE INVENTION

In a broad aspect, the present invention provides a safety system for the detection of a shaft failure and for the interruption of the further supply of energy to the driving-side end of the shaft which, while having a low rate of wear and ensuring short shut-off times, combines functional reliability with modest demands in terms of design, assembly and space.

It is a particular object of the present invention to provide solution to the above problems by a safety system designed in accordance with the features described herein. Further objects and advantages of the present invention will become apparent from the description below.

The essence of the present invention lies in the firm allocation of a light guide to the circumference of the shaft to be monitored, actually in its longitudinal direction and co-rotating with said shaft, and in the rupture of the light guide caused by a shaft failure as well as in the resultant interruption in the transmission of the light supplied to the inlet side of the light guide which thus serves as measuring element. This interruption is detected on the other end of the measuring light guide by a sensor and is used, via evaluation and control electronics, as a signal for the shut-off of the energy supply.

This form of safety system enables the required optical sensors and light sources to be arranged externally, thus making cooling devices unnecessary. Only a few simple components are required. Accordingly, the assembly, repair and maintenance effort will be minimal. The velocity of light and the resultant rapid detection of a shaft failure enable short energy-supply shut-off times to be realized.

In a further development of the present invention, several measuring light guides can be provided which can also be routed back as a loop to the light inlet side. The light source and the sensor components can be connected immediately ahead of the measuring light guide/s or be arranged externally using additional light guides for light inlet and outlet. The inlet side of the measuring light guides can be arranged axially centrally or offset from the center. Light outlet can take place and be sensed in the axial or in the radial direction. The auxiliary light guide or the light source for the supply of light can be annular in order to supply several measuring light guides arranged on a circular line with light from only one light source.

In accordance with a further feature of the present invention, the firm allocation of the measuring light guide to the shaft to be monitored, and thus the co-rotation of the measuring light guide and the shaft, is realized by a measuring sleeve arranged coaxially with and connected at both ends to the shaft. In the event of a shaft failure, the measuring sleeve will be destroyed and the measuring light guide will break. The resultant absence of light transmitted through the measuring light guide will be registered by the optical transmitter and, upon appropriate evaluation in the evaluation electronics, be used as signal for the control of a shut-off mechanism for the driving side of the shaft.

In a further development of the present invention, the measuring sleeve includes an inner tube and an outer tube. In the inner tube, longitudinal retaining grooves for the accommodation of the measuring light guide are provided so that the light guide will break immediately if the measuring sleeve fails in consequence of a shaft failure. The outer tube, which has a higher strength than the inner tube, is used for the support of the measuring light guide/s and the inner tube.

BRIEF DESCRIPTION OF THE DRAWINGS

The present invention is more fully described in the light of the accompanying drawings showing an embodiment by way of example of a low-pressure turbine shaft of a gas-turbine engine using liquid fuel as source of energy. In the drawings.

DETAILED DESCRIPTION OF THE INVENTION

The detailed description below should be read in conjunction with the summary of the invention above.

Figure 1:
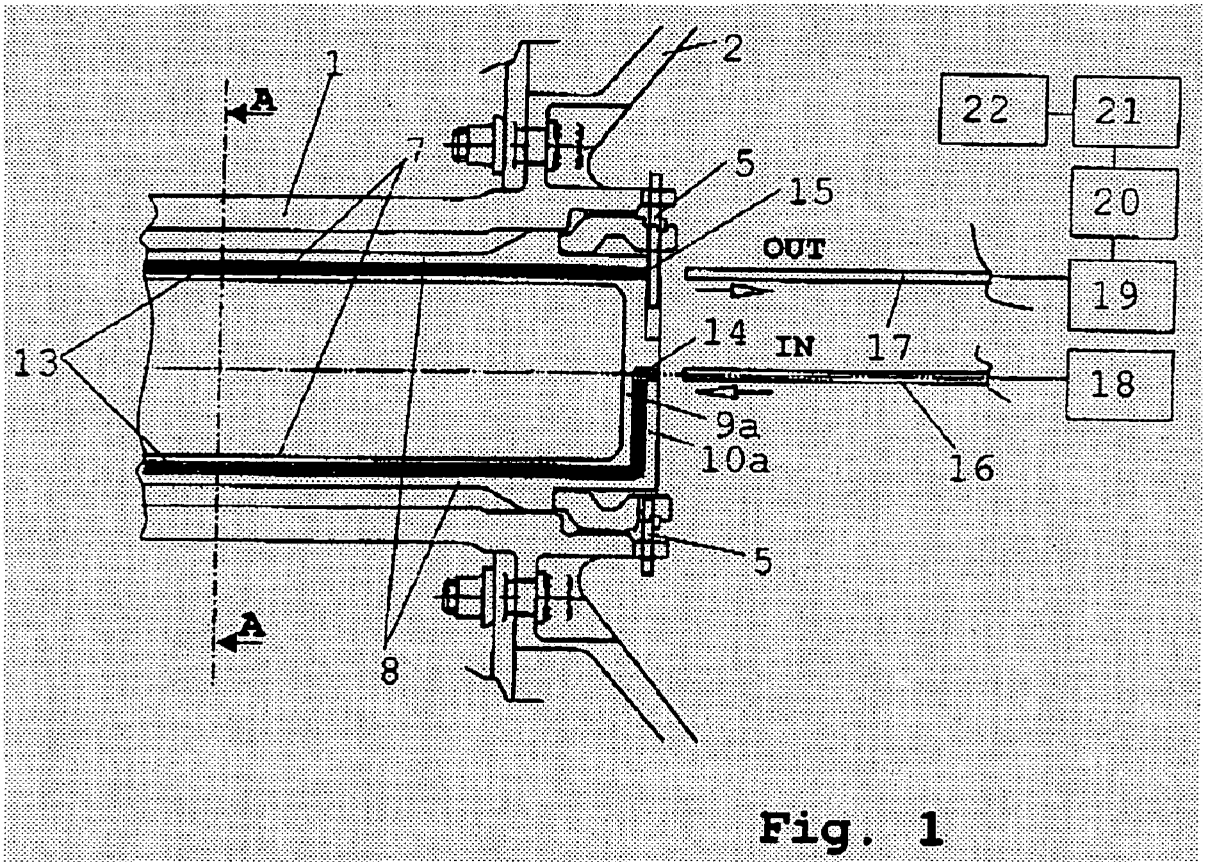
FIG. 1 is a sectional view of the rearward, driving-side end of a low-pressure turbine shaft to be monitored for shaft failure to which the low-pressure turbine rotor is attached.
Figure 2:
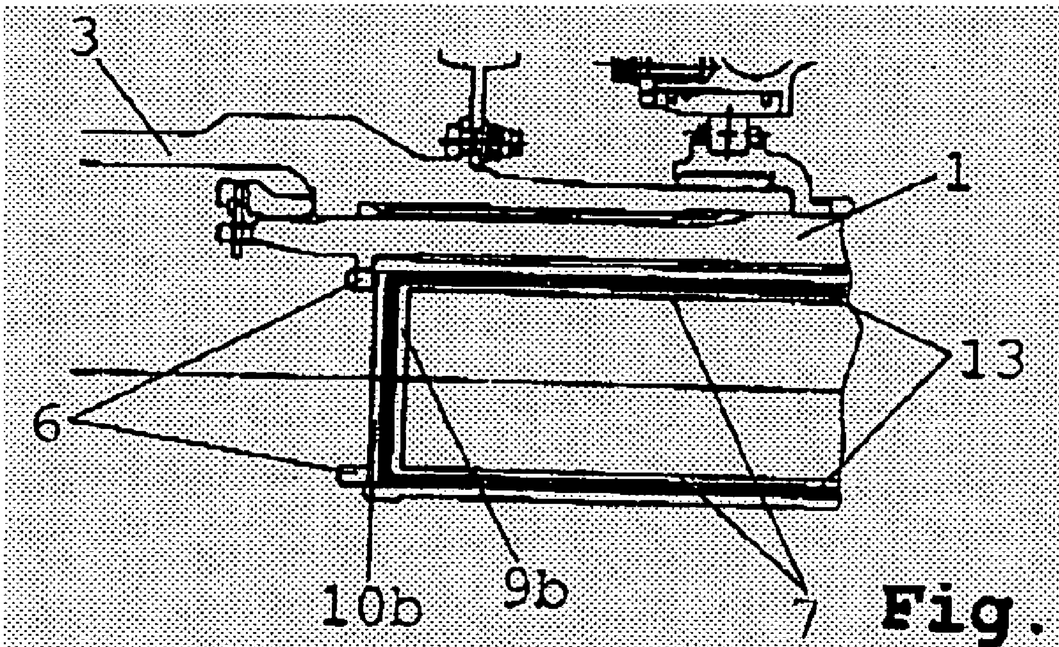
FIG. 2 is a sectional view of the forward, driven-side end of the low-pressure turbine shaft to which the fan of a gas-turbine engine is attached.
Figure 3:
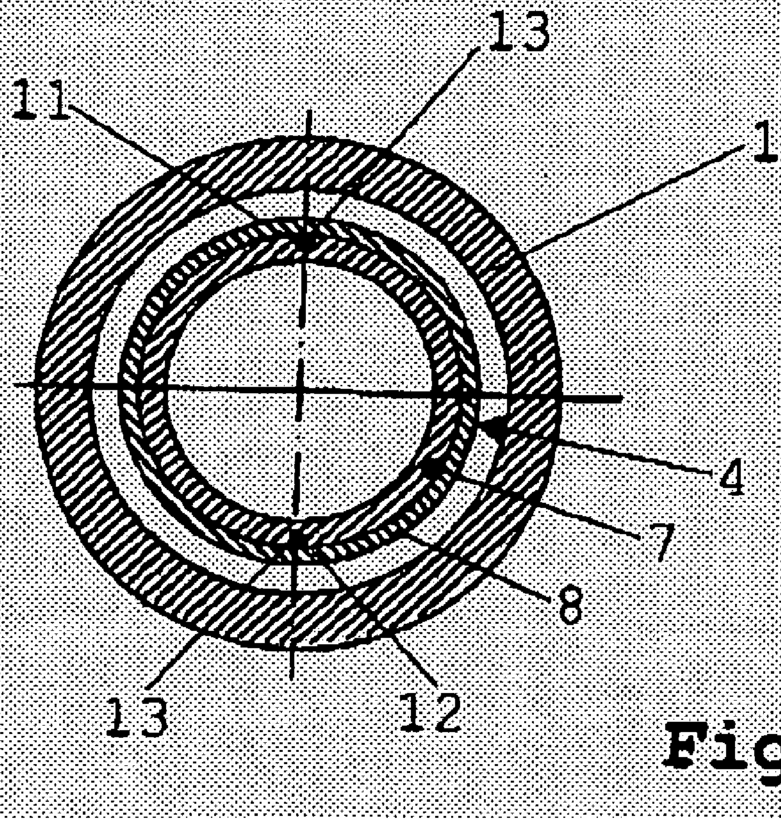
FIG. 3 is a sectional view along line A—A in FIG. 1.

As indicated in FIGS. 1 and 3, the low-pressure turbine rotor 2 is attached to the driving side and the fan 3 (compressor) to the driven side of the low-pressure turbine shaft 1. Inside of the low-pressure turbine shaft 1, a coaxial measuring sleeve 4 is arranged which, at both ends, is firmly attached both circumferentially and axially to the low-pressure turbine shaft 1 by fasteners 5, 6, thus co-rotating with the shaft. The measuring sleeve 4 comprises an inner tube 7 and an outer tube 8 which are blanked at either end faces by a base plate 9*a, b* and 10*a, b*, respectively. In the outer circumference of the inner tube 7, two retaining grooves 11, 12 are provided which are opposite to each other and extend in the longitudinal direction of the measuring sleeve 4 and accommodate—flush with the surface of the inner tube 7—the measuring light guide 13. The outer tube (supporting tube) 8 retains the measuring light guide 13 in the outward direction against the high centrifugal forces and locates it radially in the retaining grooves 11, 12. Thus, the measuring light guide 13 is embedded into the circumferential wall of the measuring sleeve 4. The strength of the outer tube 8, which takes up the centrifugal forces and centers the measuring sleeve 4, is appropriate for the forces occurring.

The inner tube 7, which serves as a rupture tube, is constructed, however, of an easily rupturing, relatively weak material. In the present embodiment, the measuring light guide 13 starts out at a central inlet hole 14 in the rear base plate 9*a*, extends initially between the two rear base plates 9*a* and 10*a* and further in the retaining groove 12 (bottom groove in the FIGS.), then between the two front base plates 9*a* and 10*b* and subsequently runs back in the retaining groove 11 (upper groove in the FIGS.) to the starting side to end in an outlet hole 15 on the outer rim of the rear base plate 9*a*. Arranged next to and remote of the start (inlet hole 14) and the end (outlet hole 15) of the measuring light guide 13, which co-rotates with the measuring sleeve 4, are a first auxiliary light guide (light inlet line) 16 with externally connected light source 18 and a second auxiliary light guide (light outlet line) 17 with externally connected optical sensor 19. The light source 18 and the optical sensor 19 can also be arranged immediately behind the inlet hole 14 or the outlet hole 15 of the measuring light guide 13, in which case appropriate cooling devices must be provided. The optical sensor 19 is connected to the evaluation electronics 20 and an electronic control 21 to actuate a fuel shut-off valve 22 provided in the fuel supply on the basis of the signals received from the optical sensor 19.

The above described safety system functions as follows: Light is continuously transmitted from the light-emitting end of the light inlet cable (first auxiliary light guide 16) arranged before the central inlet hole 14 through the measuring light guide 13 and, due to the rotation of the measuring sleeve 4, received as continuously recurrent light pulse on the light exit side (outlet hole 15). If the low-pressure turbine shaft 1 fails, the measuring sleeve 4, which is connected at both ends to, and is otherwise arranged with clearance in, the low-pressure turbine shaft 1, will also break, preferably at its weaker inner tube 7 (rupture tube). Since the measuring light guide 13 is held in the retaining groove 11, 12, it will also be ruptured immediately and the light beam interrupted. The interruption of the light beam detected by the optical sensor 19 is used as signal in the evaluation electronics 20 and the electronic control 21 for indication of a shaft failure and for cut-off of the fuel supply at the fuel shut-off valve 22, thereby preventing the low-pressure turbine shaft 1 from running-up further and limiting, or avoiding, the dangerous consequences of overspeed.

The various aspects of the embodiments described herein can be combined in different manners to create different embodiments. The retaining grooves can be positioned on the outer tube and certain of the functions of the inner and outer tubes can be reversed.

What is claimed is:

1. An electronic safety system, for the avoidance of an overspeed condition in the event of a shaft failure by detection of the shaft failure and subsequent interruption of further energy supply to the shaft, comprising:

at least one measuring light guide, which extends longitudinally along the shaft and which is attached to and co-rotates with the shaft, the at least one measuring light guide having a light inlet side constructed and arranged to receive an input light and a light outlet side constructed and arranged to output the input light;

a light source positioned to input light into the input side of the measuring light guide;

an optical sensor positioned to sense the output light from the outlet side of the measuring light guide;

the at least one measuring light guide attached at both a driven end and a driving end of the shaft in a manner such that a failure of the shaft between the driven end and the driving end ruptures the measuring light guide, thereby cutting light transmission between the light source and the optical sensor through the at least one measuring light guide;

evaluation electronics for evaluating received light signals at the optical sensor and indicating a shaft failure upon receipt of changed light signals at the optical sensor due to rupture of the at least one measuring light guide; and control electronics for interrupting an energy supply to a driving side of the shaft when a shaft failure is indicated by the evaluation electronics.

2. An electronic safety system in accordance with claim 1, wherein the light source and the sensor are positioned adjacent to the light inlet side and the light outlet side, respectively, of the at least one measuring light guide.

3. An electronic safety system in accordance with claim 1, and further comprising auxiliary light guides, wherein the light source and the sensor are positioned remote from the at least one measuring light guide and are optically coupled with the at least one measuring light guide via the auxiliary light guides.

4. An electronic safety system in accordance with claim 1, wherein the light inlet side of the at least one measuring light guide is positioned at an axis of the shaft while the light outlet side of the at least one measuring light guide is positioned radially outwardly with respect to the shaft.

5. An electronic safety system in accordance with claim 1, wherein the light inlet side and the light outlet side of the at least one measuring light guide are positioned radially outwardly from an axis of the shaft.

6. An electronic safety system in accordance with claim 5, and further comprising at least one of an annular light guide or an annular light source for supplying light to the at least one measuring light guide.

7. An electronic safety system in accordance with claim 6, wherein the annular light guide is connected immediately to the at least one measuring light guide.

8. An electronic safety system, in accordance with claim 1, wherein the at least one measuring light guide is routed as a loop, with the inlet and outlet side being positioned on a same shaft end.

9. An electronic safety system in accordance with claim 8, and further comprising a measuring sleeve which is connected between the driven end and the driving end of the shaft and which retains the at least one measuring light guide.

10. An electronic safety system in accordance with claim 9, wherein the measuring sleeve comprises an inner tube and an outer tube surrounding the inner tube for radially retaining the at least one measuring light guide therebetween, at least one of the tubes including at least one retaining groove which accommodates and circumferentially retains the at least one measuring light guide.

11. An electronic safety system in accordance with claim 10, wherein the inner tube includes the retaining groove, the inner tube constructed to be weaker than the outer tube to act as a rupture tube upon shaft failure.

12. An electronic safety system in accordance with claim 11, wherein the inner tube is constructed of a weaker material than the outer tube.

13. An electronic safety system in accordance with claim 1, and further comprising a measuring sleeve which is connected between the driven end and the driving end of the shaft and which retains the at least one measuring light guide.

14. An electronic safety system in accordance with claim 13, wherein the measuring sleeve comprises an inner tube and an outer tube surrounding the inner tube for radially retaining the at least one measuring light guide therebetween, at least one of the tubes including at least one retaining groove which accommodates and circumferentially retains the at least one measuring light guide.

15. An electronic safety system in accordance with claim 14, wherein the inner tube includes the retaining groove, the inner tube constructed to be weaker than the outer tube to act as a rupture tube upon shaft failure.

16. An electronic safety system in accordance with claim 15, wherein the inner tube is constructed of a weaker material than the outer tube.

17. An electronic safety system in accordance with claim 16, wherein the shaft is a shaft of a gas turbine engine.

18. An electronic safety system in accordance with claim 1, wherein the shaft is a shaft of a gas turbine engine.

19. An electronic safety system in accordance with claim 3, and further comprising a measuring sleeve which is connected between the driven end and the driving end of the shaft and which retains the at least one measuring light guide.

20. An electronic safety system in accordance with claim 19, wherein the measuring sleeve comprises an inner tube and an outer tube surrounding the inner tube for radially retaining the at least one measuring light guide therebetween, at least one of the tubes including at least one retaining groove which accommodates and circumferentially retains the at least one measuring light guide.

21. An electronic safety system in accordance with claim 20, wherein the inner tube includes the retaining groove, the inner tube constructed to be weaker than the outer tube to act as a rupture tube upon shaft failure.

22. An electronic safety system in accordance with claim 1, and comprising a plurality of measuring light guides.

* * * * *